United States Patent [19] [11] Patent Number: 4,731,422
Tanabe et al. [45] Date of Patent: Mar. 15, 1988

[54] RESINOUS MODIFIED POLYESTER COMPOSITION FOR A TOP COAT

[75] Inventors: Hisaki Tanabe, Kyoto; Masahiko Togo, Kanagawa; Hirotoshi Umemoto, Kyoto, all of Japan

[73] Assignee: Nippon Paint Co., Ltd., Osaka, Japan

[21] Appl. No.: 890,484

[22] Filed: Jul. 29, 1986

[30] Foreign Application Priority Data

Jul. 31, 1985 [JP] Japan ................. 60-170196

[51] Int. Cl.$^4$ .............................................. C08G 63/76
[52] U.S. Cl. ................................. 525/437; 528/296; 528/302; 528/303; 528/304
[58] Field of Search ............... 528/302, 303, 304, 296; 525/437

[56] References Cited

U.S. PATENT DOCUMENTS 4,405,764  9/1983  Tobias et al. ...................... 525/443
4,454,313  6/1984  Okitsu et al. ...................... 528/302
4,536,531  8/1985  Ogawa et al. ...................... 524/135
4,569,973  2/1986  Tyrell et al. ...................... 525/437

*Primary Examiner*—Lucille M. Phynes
*Attorney, Agent, or Firm*—Wenderoth, Lind & Ponack

[57] ABSTRACT

A resinous composition for a top coat comprising a polyester resin modified with a lactone, said polyester resin being characterized in that 10 to 80 mole % of acid component is an alicyclic polycarboxylic acid or anhydride thereof, and 10 to 100 mole % of the carboxyl groups capable of developing a resinous acid value is derived from a polycarboxylic acid which will show a potentiometric midpoint potential in a non-aqueous potentiometric titration, in the state being incorporated into the resin, of −350 mV or more.

The coating composition based on said resinous composition is specifically useful as a top coat for automobile bodies in two-tone-color coating.

2 Claims, No Drawings

RESINOUS MODIFIED POLYESTER COMPOSITION FOR A TOP COAT

FIELD OF THE INVENTION

The present invention relates to a resinous composition for a top coat and more specifically, to a resinous composition for a top coat which is particularly useful for the coating of automobile bodies in the so-called two-tone-color coating.

BACKGROUND OF THE INVENTION

Since a polyester resin can result in a coating with excellent film properties such as weather resistance, flame resistance, chemical resistance and the like, it is being watched with keen interest in various technical fields and especially in the automobile industry as a resinous vehicle for a top coat. Usually, a polyester resin is compounded with an aminoaldehyde resin and thus obtained composition is applied and baked to give a tough coating which is excellent in mechanical properties and inter coat adhesion and the like. Nevertheless, such a composition has scarcely been used in an automobile industry as a top coat because the coating has the problems of cissing, loss in gloss and in contrast factor, and heretofore proposed polyester resins each has a problem of poor compatibility with amino resin. Recently, various attempts have been made to improve the properties of an oil-free polyester resin. For example, in Japanese Patent Application Kokai No. 20068/81, a large quantity of saturated alicyclic carboxylic acid or a combination of a saturated alicyclic polycarboxylic acid and an aromatic polycarboxylic acid are used as acid components of said polyester resin, thereby attaining improvements in cissing, loss in gloss and weather resistance of the coating and compatibility of the resin with an amino-plast resin; in Japanese Patent Application No. 155632/82, an alicyclic polycarboxylic acid is used as an acid component and the carboxyl groups capable of developing a resinous acid value are controlled in kind, thereby improving the weather resistance, mechanical properties, intercoat adhesion and curing property of the coating; and in Japanese Patent Applicaition Kokai Nos. 111864/83 and 111865/83, a large quantity of alicyclic polycarboxylic acid is used as an acid component and a comparatively long methylene chain is included in either one of dicarboxylic acid or diol component, or in a lactone to be used for the modification of the formed polyester, thereby improving durability, adhesion properties, elongation and softness of the coating. These studies are noteworthy in a sense that they apply to the practical use of polyester resin, as a resinous vehicle, in an automobile top coat or coating composition to be applied to flexible materials such as fender, bumper and other parts.

In a top coating of automobile bodies and especially in a two-tone-color coating, the main color composition is first applied and baked, and without sanding operation, the second color composition is then applied and baked. At that time, there often arises an interface adhesive failure between the first and the second color coatings. This is especially true when a solid color coating composition is applied on a metallic coat, which combination is most important and in great demand at the present moment. What is worse still, it has been found that the higher the baking temperature of the metallic coat, the poorer the two-tone adhesion.

Under the circumstances, it has long been desired to provide a polyester resin composition for a top coat which is excellent in weather resistance, film properties and curing properties, said composition being suitable for forming a high build coating and to a two-tone color coating and especially recoating of solid color onto a metallic coat, and giving an excellent two-tone adhesion over a wide range of baking conditions.

A principal object of the present invention is therefore, to provide a polyester resin which will fulfill the abovesaid requirements.

SUMMARY OF THE INVENTION

According to the invention, the abovementioned object can be attained by a resinous composition for a top coat comprising a polyester resin modified with a lactone, said polyester resin being composed of alcohol and acid components, 10 to 80 mole% of the acid component being an alicyclic polycarboxylic acid or anhydride thereof and 10 to 100 mole% of the carboxyl groups capable of developing a resinous acid value being derived from a polycarboxylic acid showing a titration midpoint potential in a non-aqueous potentiometric titration, under the state being incorporated into the resin, of −350 mV or more, and said lactone being represented by the formula:

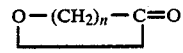

in which n is an integer of 4 to 10, and included in an amount corresponding to 5 to 30% by weight of the total weight of the resin.

PREFERRED EMBODIMENTS OF THE INVENTION

The lactone modified polyester resin of the present invention may be successfully and advantageously prepared by using a similar, but slightly modified method as described in Japanese Patent Application Kokai No. 4054/84. That is, a polyester resin having as acid components (a) mole of a saturated alicyclic polycarboxylic acid (A), (b) mole of a polycarboxylic acid (B) whose titration midpoint potential in non-aqueous potentiometric titration, under the state being incorporated into the resin, is −350 mV or more, and (c) mole of other poly- and/or mono-carboxylic acid (C) (wherein $a+b+c=1.0$ mole; $0 \leq c$ mole and $$10 \leq \frac{a}{a+b+c} \times 100 \leq 80 \text{ mole \%})$$

is prepared by the combination of steps of reacting an acid mixture of (a) mole of the acid (A), $(b-b_1)$ mole of the acid (B) and (c) mole of the acid (C), with a polyhydric alcohol to obtain a polyester prepolymer having a resinous acid value of M, in which $M=N(1-x/100)$ and then adding $(b_1)$ mole of the acid (B) and continuing the esterification until it reaches a resinous acid value of N.

In the abovesaid statement, $(b_1)$ is equal to (b) or less than (b), and denotes the molar amount of said (B) acid to be charged at a later stage, which is determined by the following equation:

$$b_1 = \frac{\frac{x}{100} \times N \times W}{56100} \times \frac{1}{f} \times \frac{1}{1 - \frac{P}{100}}$$

wherein N stands for the resinous acid value (KOH mg required for the neutralization of 1 g of resinous solid matter); W is the weight of polyester resin; f is the number of functional groups possessed by (B); P is the reaction percentage of (B) at the later charging stage; x is the mole% of (B) occupied in the carboxyl groups capable of developing a resinous acid value and determined in a range of $10 \leq x \leq 100$.

Thus obtained polyester resin which is composed of alcohol and acid components, 10 and 80 mole% of the acid component being an alicyclic polycarboxylic acid and 10 to 100 mole% of the carboxyl groups capable of developing a resinous acid value being derived from a polycarboxylic acid which will show a titration midpoint potential in a non-aqueous potentiometric titration, under the state being incorporated into the resin, of −350 mV or more, is then reacted with a lactone of the formula:

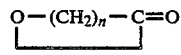

wherein n is an integer of 4 to 10 in an amount corresponding to 5 to 30% by weight of the total weight of the resin, to obtain the present lactone modified polyester resin. Among the said acid components, examples of saturated alicyclic polycarboxylic acid (A) are cyclohexane ring bearing alicyclic acids such as, for example, 1,1-cyclohexane dicarboxylic acid, hexahydrophthalic acid and its anhydride, 1,3-cyclohexane dicarboxylic acid, 1,4-cyclohexane dicarboxylic acid, methylhexahydrophthalic acid and its anhydride, hexahydrotrimellitic acid and its anhydride, and hexahydro-2-methyl-trimellitic acid and its anhydride. Examples of polycarboxylic acid (B) having the titration midpoint potential in non-aqueous potentiometric titration, under the state being incororated into a resin, of −350 mV or more are aromatic polycarboxylic acids such as phthalic anhydride, isophthalic acid, terephthalic acid, trimellitic anhydride, pyromellitic anhydride and the like. Such polycarboxylic acid per se will, in general, show, when an electric potential-TBAH titer curve is made from the test results of non-aqueous potentiometric titration, a curve having multi-stage inflection points, and however, when incorporated in to a polyester chain, at least one carboxyl group will remain in a free state and the corresponding curve will have the diminished number of inflection points, accordingly.

Under such conditions, if a polycarboxylic acid is possessed of such acid strength that the aforesaid titration midpoint potential is −350 mV or more, then such a member may advantageously be used for the object of the present invention.

As the acid components, other poly- and/or monocarboxylic acids (C) than the abovesaid (A) and (B) may be present, if desired. Such acid (C) may be any of the members customarily used as an acid component of polyester resin, including aliphatic or partially saturated alicyclic acids, like succinic acid and its anhydride, adipic acid, azelaic acid, sebacic acid, tetrahydrophthalic anhydride, maleic anhydride, fumaric acid, itaconic acid and the like. Furthermore, monocarboxylic acids as benzoic acid, p-t-butyl benzoic acid and the like may be added for the purpose of regulating the molecular weight of the resin. The polyhydric alcohol component to be reacted with said acid mixture is not of specific type and is suitably selected from the members customarily used for the preparation of polyester resins. Examples of such members are ethyleneglycol, diethyleneglycol, propyleneglycol, neopentylglycol, 1,2-butyleneglycol, 1,3-butyleneglycol, 2,3-butyleneglycol, 1,4-butyleneglycol, 1,6-hexanediol, 1,5-pentanediol, 2,5-hexanediol, trimethylolethane, trimethylolpropane, glycerin, pentaerythritol, diglycerin, sorbitol, 1,4-cyclohexane dimethanol and the like. As already stated, the present acid controlled modified polyester resin must be of the nature such that 10 to 80 mole% of the total acid components be occupied by said saturated alicyclic polycarboxylic acid (A) and 10 to 100 mole% of the carboxyl groups capable of developing a resinous acid value be derived from polycarboxylic acids (B) having a titration midpoint potential in a non-aqueous potentiometric titration, under a state such that carboxylic acid is capable of developing a resinous acid value, of −350 mV or more. This is because, if the content of saturated alicyclic polycarboxylic acid is less than 10 mole% of the total acid components, weather resistance may not be improved, whereas if it exceeds the upper limit of 80 mole%, the resistance will be lowered. As to the ratio of carboxyl groups responsible for the development of the resinous acid value, if the amount of said polycarboxylic acid having the specified cid strength is less than 10 mole%, then there is a general trend towards producing coating of insufficient gloss and curing properties and hence, the object of the present invention cannot be attained.

In an actual preparation of said acid controlled modified polyester resin, a polyester prepolymer is first prepared by using an acidic mixture of said acid (A) and poly- and/or mono-carboxylic acid (C) including, as desired, a part of the polycarboxylic acid (B), together with a polyhydric alcohol, and to thus obtained polyester prepolymer, the whole or remaining parts of the acid (B) is then added and the esterification is continued to obtain the intended product. As to the amounts of polycarboxylic acid (B) to be charged in the first and in the second stage of reaction, the later charging amount ($b_1$ mole) is calculated beforehand from the abovesaid equation using the known values for (f): number of functional groups possessed by the acid (B), (N): resinous acid value, (W): weight of the resin, (x): mole% of the carboxyl groups derived from the acid (B) occupied in the total carboxyl groups capable of developing resinous acid value, and (P): reaction percentage of the later charging acid (B). The amount (b mole) of said acid (B) to be charged in the first stage is determined as ($1-b_1$) mole.

Incidentally, in the abovesaid equation, the reaction percentage (P) is the value showing what % of carboxyl groups in the polycarboxylic acid (B) should be reacted in order that the acid is surely incorporated into the polyester chain through an esterification, and said (P) is, for example, 50% or more in the case of dicarboxylic acid such as phthalic anhydride, and about 34% or more in the case of tricarboxylic acid such as trimellitic acid. The esterification of polycarboxylic acids with a polyhydric alcohol may be carried out in a conventional way and no particular technique is required therefor.

In a preferred embodiment, the esterification shall be continued until the resinous acid value reaches 1 to 135 in the first step for obtaining a polyester prepolymer and 1 to 150 in the second step for obtaining an acid controlled modified polyester resin. As to the number average molecular weight of the polyester resin, it may be freely selected in the range which is common in the heretofore proposed polyester resins for coating use.

In this way, an acid controlled modified polyester resin having alcohol and acid components, 10 to 80 mole% of said acid component being an alicyclic polycarboxylic acid (A) and 10 to 100 mole% of the carboxyl groups capable of developing a resinous acid value being derived from a polycarboxylic acid (B) showing a titration midpoint potential in a non-aqueous potentiometric titration, under the state being incorporated into the resin, of −350 mV or more, can be obtained.

According to the present invention, the abovesaid polyester resin is then reacted with a lactone of the formula:

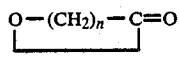

wherein n is an integer of 4 to 10, to obtain an acid controlled, lactone-modified polyester resin. Examples of said lactone are ε-caprolactone, ζ-enantholactone, η-caprylolactone, and their ring substituted derivatives. Particularly preferred members are the lactones having 6 to 8 carbon atoms.

Lactone modification may be carried out in a conventional way by adding a lactone to the abovesaid acid controlled modified polyester resin and heating the mixture. At this time, the added lactone is ring-opened and reacted with a hydroxyl goup of said polyester resin to give a lactone modified resin.

In this reaction, it is preferred to use a catalyst such as tin compounds, organic lead or manganese salts, and the like. Particularly preferred members are the tin compounds of the formula:

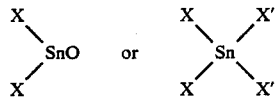

wherein X stands for an alkyl, an aryl, an aralkyl, or an aryloxy group, and X' is an alkyl, an aryl, an aralkyl, an acyloxy, a halogen or hydroxyl group.

Examples include tetraphenyl tin, tetraoctyl tin, diphenyl tin dilaurate, tri-n-butyl tin hydroxide, tri-n-butyl tin acetate, dimethyl tin oxide, dibutyl tin oxide, dilauryl tin oxide, di-n-butyl tin dichloride, dioctyl tin dichloride and the like, and lead acetate, manganese acetate, lead 2-ethyl hexane acetate, lead salicylate, lead benzoate and the like. The lactone moiety of thus obtained polyester resin is believed, under the state incorporated into the polyester chain, to produce an optimum flexibility of the resin. The presence of lactone in the polyester resin is, thus, important in this invention. However, the lactone amount should preferably be limited in a range corresponding to 5 to 30% of the total weight of the resin. This is because, if the lactone amount is less than 5% by weight of the total resin, it is unable to achieve the desired elongation, Erichsen test results and impact resistance, and if it is over the upper limit of 30% by weight of the total resin, there will give a coating with inferior properties especially in respect of tensile strength, hardness, chemical resistance and water resistance. These are undesirable for the intended object of having a resinous composition for a top coat.

The present resinous composition has many desirable properties as follows.

Since an alicyclic polycarboxylic acid is used as a part of acid component of the polyester resin, an excellent weather resistance is given to the coating.

Since the resin is modified with a lactone, impact resistance of the coating is greatly improved.

From the abovesaid two characteristics, an improved solubility is given to the resin and hence a high solid coating composition can be formulated with the present resinous composition.

Since a reactive hydroxyl group is given to the resin by the lactone modification and the carboxyl groups capable of developing a resinous acid value are controlled in kind, the reactivity of the resin towards curing with a crosslinking agent such as aminoaldehyde resin, isocyanate compound and the like is greatly improved.

Furthermore, very surprisingly, it has been found that the present resinous composition has an excellent two-tone adhesion especially in the case of a solid color coating on a metallic coat. Thus, the present resinous composition is an ideal resinous vehicle for a top coat composition to be used in two-tone color coating.

The exact reasons why the present resinous composition can give an excellent two-tone adhesion have not been found yet. However, the following two reasons, in cooperation with each other, might be responsible. That is, since an alicyclic polycarboxylic acid and a lactone are included as constituting elements of the resin, wetting property of the coating composition towards a clear coat customarily applied onto a metallic coat is greatly improved.

Secondly, when a solid color coating is baked at a higher temperature and then allowed to cool to room temperature, a great internal stress is inevitably generated by shrinking within the coating and however, when the lactone is included in the polyester resin, the abovesaid internal stress is greatly relieved by the presence of the methylene chain of said lactone. These however, should not be taken as being limitative for the present invention.

The present inventors have also found that a similar resinous composition having the desired properties can be provided even if the base resin, i.e. oil-free polyester resin, is replaced by an alkyd resin whose oil length is up to 30% of the total weight of the resin. Therefore, the term "polyester resin" as used herein denotes both of an oil-free polyester resin and an alkyd resin whose oil length is up to 30% of the total weight of the resin.

The invention shall be now more fully explained in the following Examples. Unless otherwise being stated, all parts and percentages are by weight.

EXAMPLE 1

Preparation of ε-caprolactone modified polyester resin composition

| Composition of ε-caprolactone modified polyester resin A | |
|---|---|
| hexahydro phthalic anhydride | 12.15 parts |
| isophthalic acid | 52.18 |

-continued

| Composition of ε-caprolactone modified polyester resin A | |
|---|---|
| trimethylol propane | 10.34 |
| neopentyl glycol | 32.29 |
| 1,6-hexanediol | 7.12 |
| ε-caprolactone | 15.46 |
| dibutyl tin oxide | 0.025 |
| Total | 129.565 |

Into a reaction tank fitted with a heating device, a stirrer, a reflux condenser, a water separator, a fractionating column, and a thermometer, the abovementioned materials excluding isophthalic acid and ε-caprolactone were placed and the mixture was heat melted.

Stirring was then started and the mixture was heated to 240° C. At this time, from 200° C. to 240° C., the temperature was raised at a constant speed in 3 hours. The formed condensation water was successively distilled out of the system. When the tank content reached 240° C., the mixture was maintained at the same temperature for 30 minutes, 3 parts of xylene were then gradually added, and reaction was switched to a condensation in the presence of said solvent and continued until the resinous acid value reached 2.0. The tank was then allowed to cool to 100° C. to obtain a polyester prepolymer A-1.

Next, 52.18 parts of isophthalic acid were added to the reaction tank and the mixture was heated to 220° C. At this time, from 190° C. to 220° C., the temperature was gradually raised at a constant speed in 3 hours. The reaction was continued at 220° C. until the resinous acid value came to 10 and thereafter, the mixture was allowed to cool to obtain a polyester prepolymer A-2, 20 mole% of whose acid component was occupied by the abovementioned alicyclic polycarboxylic acid and 80 mole% of the carboxyl groups capable of developing the resinous acid value being based on isophthalic acid. This resin showed a titration midpoint potential of −310 mV in a non-aqueous potentiometric titration. 15.46 parts of ε-caprolactone and 8.5 parts of xylene were then added to the reaction tank and the whole content was maintained at 150° C. for several hours, while checking the amount of unreacted ε-caprolactone by 1R means. When the reaction rate reached 98% or more, the reaction was stopped and the mixture was allowed to cool. Thereafter, the tank content was diluted with 32.7 parts of xylene to obtain ε-caprolactone modified polyester resin varnish A, the amount of ε-caprolactone being 15 wt% of the total weight of the resin, the solid content being 70.1%, varnish viscosity (Gardner, 25° C.) being V and resinous acid value being 8.8.

EXAMPLES 2 TO 3

The same procedures as stated in Example 1 were repeated with the materials shown in Table 1 and ε-caprolactone modified polyester resin varnishes B and C were obtained. The characteristics of these varnishes are shown in Table 1.

EXAMPLES 4 TO 5

The same procedures as stated in Example 1 were repeated with the materials shown in Table 1 and ε-caprolactone modified polyester resin varnishes D and E were obtained. Among the carboxyl groups capable of developing resinous acid value, 85 mole% was derived from phthalic anhydride in Example 4 and 90 mole% was derived from tetrachlorophthalic anhydride in Example 5. The titration midpoint potentials in non-aqueous potentiometric titration of these resins were −290 mV and −120 mV. The characteristics of the resin varnishes are shown in Table 1.

EXAMPLES 6 TO 9

The same procedures as stated in Example 1 were repeated with the materials shown in Table 1 and ε-caprolactone modified polyester resin varnishes F to I were obtained. The characteristics of these varnishes are shown in Table 1.

EXAMPLE 10

Using 3-methyl hexahydro phthalic anhydride as an alicyclic polycarboxylic acid and the materials shown in Table 1 and following the procedures of Example 1, a ε-caprolactone modified polyester resin varnish J was obtained, the characteristics of said varnish being shown in Table 1.

EXAMPLE 11

Using the same materials and the same procedures as stated in Example 1, but charging ε-caprolactone together with other materials in the first step of reaction and increasing the amount of dibutyl tin oxide from 0.025 part to 0.075 part, ε-caprolactone modified polyester resin varnish K was prepared by both ester exchange reaction and esterification reaction. The characteristics of this varnish are shown in Table 1.

COMPARATIVE EXAMPLES 1 TO 6

Using the materials shown in Table 1 and following the procedures given in Example 1, various comparative resin varnishes were prepared.

The varnishes L and M of Comparative Examples 1 and 2 were based on polyester resins containing no alicyclic polycarboxylic acid and no lactone.

The varnish N of Comparative Example 3 was based on polyester resin containing no lactone, whose carboxyl groups capable of developing a resinous acid value were derived from the polycarboxylic acid showing a titration midpoint potential in non-aqueous potentiometric titration, of −400 mV. The varnish O of Comparative Example 4 was based on a polyester resin modified with 40 wt% lactone, whose carboxyl groups capable of developing the resinous acid value were derived from the polycarboxylic acid showing a titration midpoint potential in a non-aqueous potentiometric titration, under the state incorporated into the resin, of −400 mV. The varnishes P and Q of Comparative Examples 5 and 6 each was based on a polyester resin modified with a lactone, but including no alicyclic polycarboxylic acid. The characteristics of these varnishes are shown in Table 1.

TABLE 1

| Resin compositions and characteristics of resinous varnishes | | | | | | |
|---|---|---|---|---|---|---|
| Example No. | | | | | | |
| 1 | 2 | 3 | 4 | 5 | 6 | 7 |

TABLE 1-continued

Resin compositions and characteristics of resinous varnishes

| | varnish | | | | | | |
|---|---|---|---|---|---|---|---|
| | A | B | C | D | E | F | G |
| Polyester 1st step | | | | | | | |
| hexahydrophthalic anhydride | 12.15 | 24.17 | 41.95 | 29.07 | 26.38 | 30.13 | 30.13 |
| isophthalic acid | | | | 31.21 | 28.32 | | |
| 3-methyl hexahydro phthalic anhydride | | | | | | | |
| ε-caprolactone | | | | | | | |
| trimethylol propane | 10.34 | 10.34 | 10.34 | 10.34 | 15.38 | 10.34 | 10.34 |
| neopentyl glycol | 32.29 | 32.09 | 31.80 | 32.01 | 27.70 | 31.99 | 31.99 |
| 1,6-hexanediol | 7.12 | 7.07 | 7.01 | 7.06 | 6.11 | 7.05 | 7.05 |
| coconut fatty acid | | | | | | | |
| 2nd step | | | | | | | |
| isophthalic acid | 52.18 | 38.92 | 19.30 | | | 32.34 | 32.34 |
| phthalic anhydride | | | | 2.05 | | | |
| tetrachloro phthalic anhydride | | | | | 9.50 | | |
| 3rd step | | | | | | | |
| ε-caprolactone | 15.46 | 15.72 | 16.11 | 15.87 | 16.55 | 4.73 | 38.50 |
| wt % of the total resin (%) | 15 | 15 | 15 | 15 | 15 | 5 | 30 |
| alicyclic polycarboxylic acid (mole %) | 20 | 40 | 70 | 50 | 50 | 50 | 50 |
| titration midpoint potential (mV) | −310 | −310 | −310 | −290 | −120 | −310 | −310 |
| oil length (%) | | | | | | | |
| Characteristics of varnish | | | | | | | |
| non-volatile content (%) | 70.1 | 69.8 | 69.8 | 70.0 | 75.2 | 70.4 | 70.2 |
| varnish viscosity | Y | W | T − U | V − W | U − V | Y | P − Q |
| resin. acid value of the finished resin | 8.8 | 8.7 | 8.7 | 8.5 | 18.1 | 9.6 | 7.0 |

| | Example No. | | | | Comparative Example No. | | |
|---|---|---|---|---|---|---|---|
| | 8 | 9 | 10 | 11 | 1 | 2 | 3 |
| | varnish | | | | | | |
| | H | I | J | K | L | M | N |
| Polyester 1st step | | | | | | | |
| hexahydrophthalic anhydride | 26.74 | 23.60 | | 12.15 | | | 41.95 |
| isophthalic acid | | | | | | 41.23 | 19.30 |
| 3-methyl hexahydro phthalic anhydride | | | 12.56 | | 38.91 | 9.07 | |
| ε-caprolactone | | | | 15.46 | | | |
| trimethylol propane | 16.86 | 23.37 | 10.34 | 10.34 | 32.28 | 22.90 | 10.34 |
| neopentyl glycol | 23.63 | 15.26 | 32.29 | 32.29 | 5.01 | 16.67 | 31.80 |
| 1,6-hexanediol | 5.21 | 3.37 | 7.12 | 7.12 | 1.12 | 3.67 | 7.01 |
| coconut fatty acid | 9.97 | 19.94 | | | 29.92 | 19.95 | |
| 2nd step | | | | | | | |
| isophthalic acid | 28.71 | 25.07 | 52.18 | 52.18 | | | |
| phthalic anhydride | | | | | | | |
| tetrachloro phthalic anhydride | | | | | | | |
| 3rd step | | | | | | | |
| ε-caprolactone | 10.01 | 22.61 | 15.26 | | | | |
| wt % of the total resin (%) | 10 | 10 | 15 | 15 | 0 | 0 | 70 |
| alicyclic polycarboxylic acid (mole %) | 50 | 50 | 20 | 20 | | | |
| titration midpoint potential (mV) | −310 | −310 | −310 | −310 | −290 | −310 | −400 |
| oil length (%) | 10 | 20 | | | 30 | 20 | |
| Characteristics of varnish | | | | | | | |
| non-volatile content (%) | 70.1 | 70.0 | 70.3 | 69.8 | 60.2 | 60.5 | 70.2 |
| varnish viscosity | V | S | W > X | X − W | V − W | U | X − Y |
| resin. acid value of the finished resin | 8.9 | 7.8 | 8.5 | 8.4 | 8.1 | 8.1 | 9.9 |

| | Comparative Example No. | | |
|---|---|---|---|
| | 4 | 5 | 6 |
| | varnish | | |
| | O | P | Q |
| Polyester 1st step | | | |
| hexahydrophthalic anhydride | 30.26 | | |
| isophthalic acid | 32.49 | 707.0 | 707.0 |
| phthalic anhydride | | | |
| adipic acid | | 155.0 | 155.0 |
| trimethylol propane | 11.31 | 223.0 | 223.0 |
| neopentyl glycol | 30.85 | 319.0 | 319.0 |
| 1,6-hexanediol | 6.80 | 188.0 | 188.0 |
| coconut fatty acid | | | |
| 2nd step | | | |
| isophthalic acid | | | |
| phthalic anhydride | | | |
| tetrachloro phthalic anhydride | | | |
| 3rd step | | | |
| ε-caprolactone | 59.89 | 210.0 | 840.0 |
| wt % of the total resin (%) | 40 | 13 | 37.5 |
| alicyclic polycarboxylic acid (mole %) | 50 | 0 | 0 |
| titration midpoint potential (mV) | −400 | −310 | −310 |

TABLE 1-continued

Resin compositions and characteristics of resinous varnishes

| | | | |
|---|---|---|---|
| oil length (%) | | | |
| Characteristics of varnish | | | |
| non-volatile content (%) | 69.8 | 70.2 | 70.4 |
| varnish viscosity | Q | V − W | T > U |
| resin. acid value of the finished resin | 8.5 | 13.0 | 9.2 |

EXAMPLE 12

Using the lactone modified polyester resin varnish obtained in Example 1, a white colored dispersion paste was prepared as prescribed in the following Table A and then, a white colored coating composition as prescribed in Table B.

TABLE A

Formulation of white colored dispersion paste

| | |
|---|---|
| Titanium white (Note 1) | 62 parts |
| resin varnish | 23 |
| xylene | 9 |
| Solvesso 100 | 6 |
| Total | 100 parts |

Note 1:
Titanium CR-95, manufactured by Ishihara Sangyo K.K.

TABLE B

Formulation of white colored coating composition

| | |
|---|---|
| white colored dispersion paste | 100 parts |
| resin varnish | 44 |
| melamine resin (Note 2) | 26 |
| n-butanol | 3.5 |
| triethylamine | 0.5 |
| surface conditioner | 0.3 |
| Total | 174.3 parts |

Note 2:
U-ban 128, manufactured by Mitui Toatu K.K. Thus obtained coating composition was diluted with a mixed solvent of Solvesso 100/toluene/methyl isobutyl ketone/butyl acetate = 60/20/10/10, to a viscosity of 23 seconds/No. 4 Ford Cup (20° C.).

For the subsequent test purpose, the coating substrates were prepared as follows.

SPC-1 dull steel plate was degreased, treated with zinc phosphate, subjected to a cationic electrodeposition and then coated with an inter coat.

For 2-tone adhesion test, thus coated plate was further applied with a metallic coat, by using 2 coat 1 bake system with an acrylic resin/melamine resin based metallic coating composition.

The metallic coat was baked at 180° C. for 30 minutes. Onto thus prepared coating substrates, i.e. steel plate with an inter coat and steel plate with a metallic coat, the abovesaid diluted top coat composition was spray-coated so as to give a dry film thickness of 30 to 40μ, and the coated plates were, after standing for a defined period of time, baked at 140° C. for 30 minutes. Thus obtained coatings were tested and evaluated as follows.

1. Finishing appearance

Finishing appearance was evaluated by visual observation of gloss, cissing and surface condition of the coating. Test results are given as O ... no such defects   X ... some defects, no good 2. Pencil hardness test
3. Impact strength test
   Du Pont type φ=½" 500 g
4. accelerated weather resistance test
   60° gloss retention (%) was determined after having subjected to Sunshine Weather-O-meter for 2000 hours.
5. Baked residue test
   1.5 g of the diluted coating composition (viscosity: 23 seconds/No. 4 Ford Cup, 20° C.) was heat-dried at 105° C. for 3 hours and the baked residue was determined.
6. Two-tone adhesion test
   Cross-cuts with 1 mm width cut were made in 1 cm square coating with a rager and peel test was carried out with a cellophane tape. The result was evaluated by the number of peeled out coatings in 1 cm square. The test results are shown in Table 2.

EXAMPLES 13 TO 22

Using the lactone modified polyester resin varnishes B to K obtained in Examples 2 to 11, white colored coating compositions were prepared as in Example 12. However, in Example 16 using the lactone modified polyester resin varnish E, the following was used in place of the formulation Table B.

TABLE C

Formulation of white colored coating composition for Example 16

| | |
|---|---|
| white colored dispersion paste | 100 parts |
| resin varnish E | 44 |
| melamine resin (Note 3) | 16 |
| n-butanol | 3.5 |
| triethylamine | 0.5 |
| surface conditioner | 0.3 |
| Total | 164.3 parts |

Note 3:
Cymel 303, trade mark of Mitui Toatu K.K. (methylolated melamine)

Thus obtained coating compositions were applied onto the coating substrates and evaluated in the same way as stated in Example 12. The test results are shown in Table 2.

COMPARATIVE EXAMPLES 7 TO 12

Using the polyester resin varnishes L to Q obtained in Comparative Examples 1 to 6, the coating compositions were prepared as in Example 12. The amounts of varnishes were controlled so as to give a defined amount of resin content. These compositions were applied to the coating substrates and evaluated as in Example 12. The test results are shown in Table 2.

TABLE 2

| | Example | | | | | | | |
|---|---|---|---|---|---|---|---|---|
| | 12 | 13 | 14 | 15 | 16 | 17 | 18 | 19 |
| | | | | resin varnish | | | | |
| | A | B | C | D | E | F | G | H |
| melamine | butylolated | butylolated | butylolated | butylolated | methyl- | butylolated | butylolated | butylolated |

TABLE 2-continued

| Finishing appearance | | | | | olated | | | | |
|---|---|---|---|---|---|---|---|---|---|
| Pencil hardness | H | H | H | H | HB | H-2H | HB-H | H | |
| impact strength | 40 | 40 | 40 | 40 | 40 | 30 | 50 | 35 | |
| accelerated weather resistance | 78 | 80 | 84 | 82 | 76 | 80 | 81 | 75 | |
| baked residue (wt %) | 65.1 | 66.3 | 66.2 | 64.8 | 70.2 | 64.1 | 66.7 | 65.3 | |
| 2 tone adhesion | 100/100 | 100/100 | 100/100 | 100/100 | 100/100 | 100/100 | 100/100 | 100/100 | |
| | Example and Comp. Example | | | | | | | | |
| | 20 | 21 | 22 | Comp. 7 | Comp. 8 | Comp. 9 | Comp. 10 | 11 | 12 |
| | | | | | resin varnish | | | | |
| | I | J | K | L | M | N | O | P | Q |
| melamine | butyl-olated | butyl-olated | butyl-olated | butyl-olated | butyl-olated | butyl-olated | butyl-olated | butyl-olated | butyl-olated |
| Finishing appearance | | | | | | | | | |
| Pencil hardness | HB-H | HB | H | HB | HB | B | 2B-B | B | 2B |
| impact strength | 35 | 45 | 40 | 30 | 25 | 40 | <50 | 40 | 50 |
| accelerated weather resistance | 72 | 82 | 80 | 21 | 30 | 55 | 22 | 35 | 25 |
| baked residue (wt %) | 65.6 | 67.4 | 64.2 | 60.9 | 60.7 | 65.1 | 66.8 | 65.2 | 66.4 |
| 2 tone adhesion | 100/100 | 100/100 | 100/100 | 10/100 | 15/100 | 45/100 | 80/100 | 90/100 | 95/100 |

What is claimed is:

1. A resinous composition for a top coat comprising a polyester resin modified with a lactone, said polyester resin being composed of alcohol and acid components, 10 to 80 mole % of the acid component being an alicyclic polycarboxylic acid or anhydride thereof and 10 to 100 mole % of the carboxyl groups capable of developing a resinous acid value being derived from a polycarboxylic acid showing a titration midpoint potential in a non-aqueous potentiometric titration, under the state being incorporated into the resin, of −350 mV or more, and said lactone being represented by the formula:

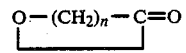

wherein n is an integer of 4 to 10, said lactone being included in an amount corresponding to 5 to 30% by weight of the total weight of the resin.

2. The composition according to claim 1 wherein the polyester resin is an alkyd resin whose oil length is up to 30% of the total weight of the resin.

* * * * *